US012274989B2

(12) United States Patent
Lee

(10) Patent No.: US 12,274,989 B2
(45) **Date of Patent: *Apr. 15, 2025**

(54) DESULFURIZER MIXING SYSTEM FOR PORT FUEL OIL

(71) Applicant: LOWCARBON CO., LTD., Jeollanam-do (KR)

(72) Inventor: Cheol Lee, Cheongju-si (KR)

(73) Assignee: LOWCARBON CO., LTD, Jeollanam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/758,688

(22) PCT Filed: Jul. 5, 2021

(86) PCT No.: PCT/KR2021/008479

§ 371 (c)(1),
(2) Date: Jul. 12, 2022

(87) PCT Pub. No.: WO2023/282361

PCT Pub. Date: Jan. 12, 2023

(65) Prior Publication Data

US 2024/0165569 A1 May 23, 2024

(51) Int. Cl.
*B01F 23/40* (2022.01)
*B01F 23/213* (2022.01)
(Continued)

(52) U.S. Cl.
CPC .......... *B01F 23/49* (2022.01); *B01F 23/2132* (2022.01); *B01F 23/411* (2022.01);
(Continued)

(58) Field of Classification Search
CPC ................. C10L 1/328; C10L 2290/40; C10L 2290/145; C10L 2290/24; C10G 29/00;
(Continued)

(56) References Cited

U.S. PATENT DOCUMENTS 9,795,938 B2 10/2017 Abo-Hammour
2010/0236134 A1* 9/2010 Mogami ............... B01F 25/422 261/18.2
2014/0305028 A1* 10/2014 Koh ....................... B01J 19/087 44/639

FOREIGN PATENT DOCUMENTS

KR 10-2000-004849 A 1/2000
KR 10-2000-005631 A 1/2000
(Continued)

OTHER PUBLICATIONS

International Search Report for International application No. PCT/KR2021/008479, Apr. 5, 2022, ISA/KR.

*Primary Examiner* — Vishal V Vasisth
(74) *Attorney, Agent, or Firm* — ArentFox Schiff LLP; Yun Choe

(57) ABSTRACT

The present invention provides a desulfurization agent mixing system for fuel oil used in harbors, the system including: a fuel oil tank for storing fuel oil; a desulfurization agent tank for storing a desulfurization agent; a line mixer receiving and mixing the fuel oil and the desulfurization agent from the fuel oil tank and the desulfurization agent tank; a droplet atomization unit for forming droplets of a mixture of the fuel oil and the desulfurization agent, the mixture being generated by the line mixer; a magnetization unit for magnetizing the mixture in which the droplets are contained; a vortex reaction unit for turning the mixture of the fuel oil and the desulfurization agent, which is magnetized by the magnetization unit; a gas separation unit configured to separate gas contained in the fuel oil and the desulfurization agent mixture in the vortex reaction unit; a collision emulsion unit configured to cause the mixture of the fuel oil and the desulfurization agent from which the gas is separated by the gas separation unit to collide against a collision target; and an emulsion tank for storing the mixture of the fuel oil
(Continued)

and the desulfurization agent, which is collided by the collision emulsion unit.

9 Claims, 3 Drawing Sheets

(51) Int. Cl.
*B01F 23/411* (2022.01)
*B01F 25/10* (2022.01)
*B01F 101/00* (2022.01)

(52) U.S. Cl.
CPC ...... *B01F 25/103* (2022.01); *B01F 2101/503* (2022.01); *B01F 2101/505* (2022.01)

(58) Field of Classification Search
CPC ....... C10G 32/02; C10G 29/16; B01F 23/803; B01F 25/25; B01F 25/1042; B01F 23/2323; B01F 25/3141; B01F 25/4521; B01F 23/411; B01F 33/821; B01F 25/103; B01F 25/43141
See application file for complete search history.

(56) References Cited

FOREIGN PATENT DOCUMENTS

| | | | |
|---|---|---|---|
| KR | 10-2008-0032931 | A | 4/2008 |
| WO | 2018-073018 | A1 | 4/2018 |

* cited by examiner

DESULFURIZER MIXING SYSTEM FOR PORT FUEL OIL

CROSS-REFERENCE TO RELATED APPLICATION

This application is a 371 U.S. national stage of PCT/KR2021/008479, filed Jul. 5, 2021, the contents of which are incorporated herein by reference.

TECHNICAL FIELD

The present invention relates to a desulfurization agent mixing system for fuel oil for use in harbors. More particularly, the present invention relates to a desulfurization agent mixing system for fuel oil for use in harbors, the system being capable of pre-mixing a desulfurization agent having a desulfurization function with fuel oil for use in harbors.

BACKGROUND ART

Sulfur oxides ($SO_x$) and nitrogen oxides (NOx) are pointed out as pollutants that cause air pollution. In particular, sulfur oxides are contained in industrial flue gas emitted during the combustion of fossil fuels containing sulfur, and the sulfur oxides cause various environmental pollution problems such as acid rain.

Desulfurization technology for removing sulfur oxides from industrial flue gas has been continuously studied, and a flue gas desulfurization method of treating flue gas after combustion of fossil fuels has been generally used in factories or power plants.

The flue gas desulfurization method refers to a method of desulfurizing the flue gas after burning a fossil fuels containing sulfur, and the flue gas desulfurization methods are categorized into wet treatment and dry treatment. A wet treatment method removes sulfur oxides by washing exhaust gas with ammonia water, sodium hydroxide solution, lime milk, etc. while a dry treatment method removes sulfur oxides by brining particles or powders of activated carbon or carbonates into contact with exhaust gas to adsorb or react with sulfur dioxide.

However, in order to use conventional flue gas desulfurization methods, it is necessary to separately build a desulfurization facility for processing the flue gas, and there is a problem in that the operation of the desulfurization facility requires a lot of labor and cost, and the desulfurization process is complicated.

In addition, the desulfurization facility can be operated in a fixed place. Therefore, there is a problem in that it is difficult to apply the desulfurization facility to movable apparatuses emitting a large amount of sulfur oxide, including container transport vehicles used in harbors and emitting sulfur oxides in a large amount.

Therefore, in order to reduce the emission of sulfur oxides related to the combustion of fossil fuels, there is an urgent need for a desulfurization method that is simple, is easy to use in industrial sites, and has an excellent desulfurization effect, and for a system to which the desulfurization method is applicable.

DISCLOSURE

Technical Problem

The present invention has been devised to solve the above problems, and an objective of the present invention is to provide a desulfurization agent mixing system for fuel oil used in harbors, the method being capable of simply removing sulfur oxides by mixing a desulfurization agent capable of removing sulfur oxides ($SO_x$) in fuel oil during combustion of a fossil fuel with the fuel oil and then fueling a vehicle or a ship with the mixture of the fuel oil and the desulfurization agent.

Technical Solution

The present invention provides a desulfurization agent mixing system for fuel oil used in harbors, the system including: a fuel tank for storing fuel oil; a desulfurization agent tank for storing a desulfurization agent; a line mixer receiving and mixing the fuel oil and the desulfurization agent from the fuel oil tank and the desulfurization agent tank; a droplet atomization unit for forming droplets of a mixture of the fuel oil and the desulfurization agent, the mixture being generated by the line mixer; a magnetization unit for magnetizing the mixture in which the droplets are contained; a vortex reaction unit for turning the mixture of the fuel oil and the desulfurization agent, which is magnetized by the magnetization unit; a gas separation unit configured to separate gas contained in the fuel oil and the desulfurization agent mixture in the vortex reaction unit; a collision emulsion unit configured to cause the mixture of the fuel oil and the desulfurization agent from which the gas is separated by the gas separation unit to collide against a collision target; and an emulsion tank for storing the mixture of the fuel oil and the desulfurization agent, which is collided by the collision emulsion unit.

The line mixer may receive 3 to 10 parts by weight of the desulfurization agent per 100 parts by weight of the fuel oil and mixes the desulfurization agent with the fuel oil.

The system may further include a gas supply unit configured to supply gas to the droplet atomization unit.

The gas may be air or oxygen ($O_2$).

The gas may form bubbles with sizes in a range of 1 to 500 micrometers (μm) in the fuel oil.

The droplet atomization unit may have a plurality of fine holes to form droplets under pressure.

The magnetization unit may magnetize the mixture with a magnetic field having a magnetic flux density of 9,000 to 15,000 gauss.

The magnetization unit forms a magnetic field perpendicular to a transport direction in which mixture of the fuel oil and the desulfurization agent flows.

The collision emulsion unit may eject the mixture of the fuel oil and the desulfurization agent such that the mixture collides against the collision target at an angle of 15°.

In addition, the emulsion tank may be equipped with a level sensor, and a mixing mode or a recirculation mode is selected according to the water level in the emulsion tank.

Advantageous Effects

The fuel oil and desulfurization agent mixing system for fuel oil used in harbors, according to the present invention, uses fuel oil, which is oil, as a continuous phase and a water-based desulfurization agent as a disperse phase. The system emulsifies the desulfurization agent in the fuel oil through water-in-oil (W/O) emulsification and feeds the resulting emulsion to vehicles or ships. Since the fuel oil and the desulfurization agent are burned together during combustion, sulfur oxides that may occur during the combustion are removed whereby sulfur oxide emissions are reduced.

In the case where the desulfurization agent mixing system for port fuel oil, according to the present invention, is used, unlike conventional systems that are fixedly installed at a predetermined site and perform a desulfurization operation on exhaust gas, a desulfurization agent is mixed with fuel oil used for vehicles that are movable devices and the mixture of the fuel oil and the desulfurization agent is fed to the vehicles. Therefore, existing vehicle engines can be used as they are, without being equipped with an additional desulfurization apparatus. The system can be simply and easily applied to existing vehicles and has an excellent desulfurization effect.

BEST MODE

Prior to describing preferred embodiments of the present invention, it should be noted that the terms and words used in the present specification and the appended claims should not be construed as limited to conventional or dictionary meanings but should be construed as meaning and concept consistent with the technical idea of the present invention.

It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, and/or components.

Hereinafter, a desulfurization agent mixing system 100 for fuel oil for used in harbors, according to the present invention, will be described in more detail.

Figure 1:
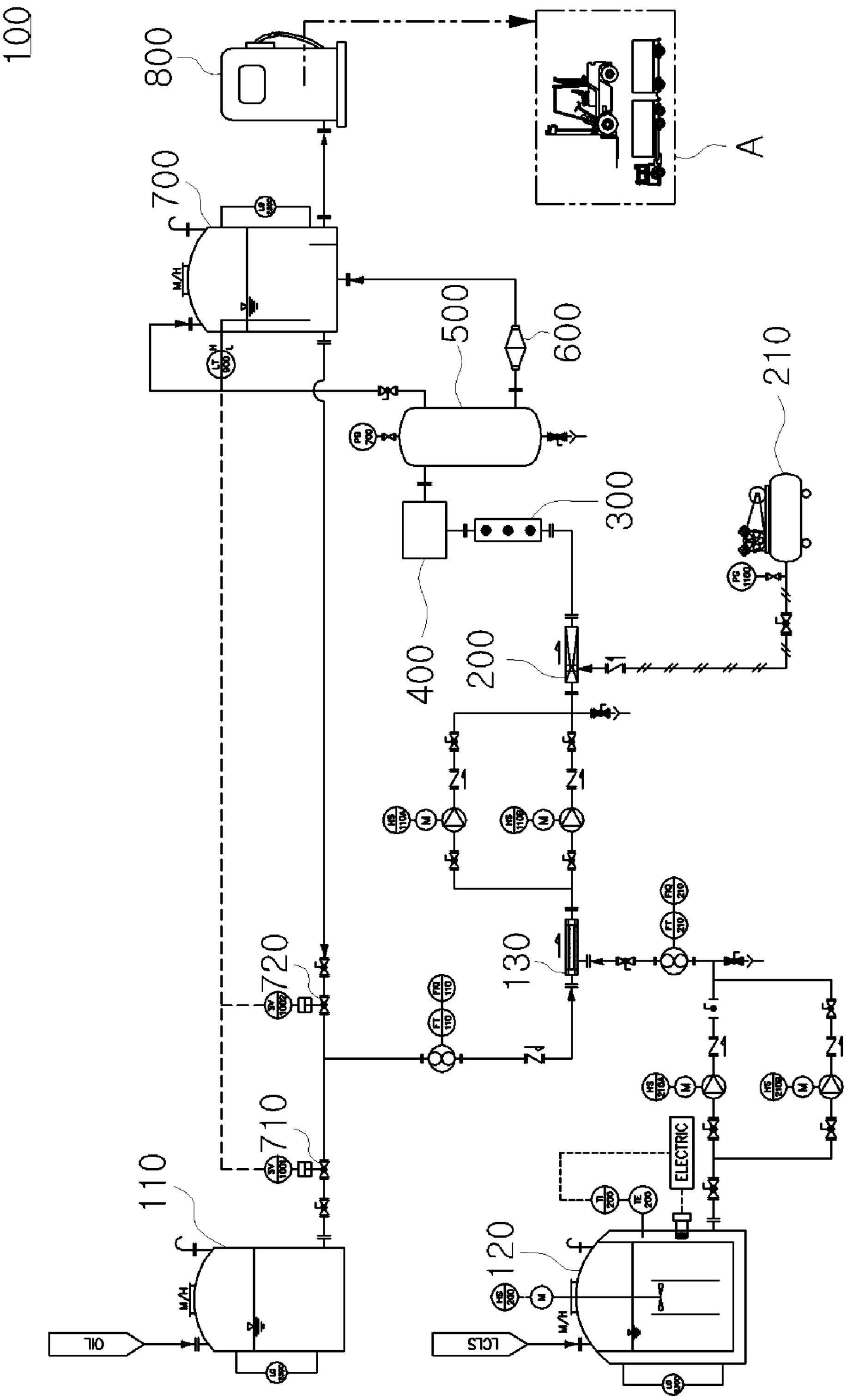
FIG. 1 is a schematic view illustrating an embodiment of a desulfurization agent mixing system for harbor fuel oil, according to the present invention.

FIG. 1 is a schematic view illustrating an embodiment of a desulfurization agent mixing system 100 for fuel oil for use in harbors, according to the present invention.

As illustrated in FIG. 1, the mixing system 100 according to the present invention includes: a fuel tank 110 for storing fuel oil; a desulfurization agent tank 120 for storing a desulfurization agent; a line mixer 130 receiving and mixing the fuel oil and the desulfurization agent from the fuel oil tank and the desulfurization agent tank, respectively; a droplet atomization unit 200 for forming droplets in the mixture of the fuel oil and the desulfurization agent, which is generated by the line mixer 130; a magnetization unit 300 for magnetizing the mixture in which the droplets are contained; a vortex reaction unit 400 for turning the mixture of the fuel oil and the desulfurization agent, which is magnetized by the magnetization unit 300; a gas separation unit 500 configured to separate gas contained in the mixture of the fuel oil and the desulfurization agent in the vortex reaction unit 400; a collision emulsion unit 600 configured to cause the mixture of the fuel oil and the desulfurization agent from which the gas is separated by the gas separation unit 500 to collide against a collision target; and an emulsion tank 700 for storing the mixture of the fuel oil and the desulfurization agent, which is collided by the collision emulsion unit 600.

According to the present invention, the fuel oil tank 110 and the desulfurization agent tank 120 store fuel oil and a desulfurization agent, respectively.

Fuel oil used in the present invention refers to gasoline and diesel mainly used for vehicles. In one embodiment, the fuel oil is light oil used as fuel for trailers frequently used in harbors, but the fuel is not limited thereto.

The desulfurization agent may be a liquid phase catalyst capable of removing sulfur oxides ($SO_x$) generated during combustion of fuel oil.

In the present invention, the desulfurization agent includes at least one oxide selected from the group consisting of $SiO_2$, $Al_2O_3$, $Fe_2O_3$, $TiO_2$, MgO, MnO, CaO, $Na_2O$, $K_2O$, and $P_2O_3$. Preferably, the desulfurization agent includes all of $SiO_2$, $Al_2O_3$, $Fe_2O_3$, $TiO_2$, MgO, MnO, CaO, $Na_2O$, $K_2O$, and $P_2O_3$.

When $SiO_2$, $Al_2O_3$, $Fe_2O_3$, $TiO_2$, MgO, MnO, CaO, $Na_2O$, $K_2O$, and $P_2O_3$ are all included in the desulfurization agent, the basic formula of the desulfurization agent becomes $K_{0.8\text{-}0.9}(Al,Fe,Mg)_2(Si,Al)_4O_{10}(OH)_2$ which is a mineral commonly called illite. The illite has a 2:1 structure in which one octahedral layer is bonded between two tetrahedral layers. The octahedral layer has a dioctahedral structure in which only 2 cation sites out of 3 cation sites in the bonding structure are filled with cations. Due to the lack of cations, the illite is overall negatively charged (−). For this reason, sulfur oxides ($SO_x$) can be adsorbed when the mixture of the fuel oil and the desulfurization catalyst is burned.

The desulfurization agent may include 15 to 90 parts by weight of $SiO_2$, 15 to 100 parts by weight of $Al_2O$, 10 to 50 parts by weight of $Fe_2O_3$, 5 to 15 parts by weight of $TiO_2$, 20 to 150 parts by weight of MgO, 10 to 20 parts by weight of MnO, and 20 to 200 parts by weight of CaO, 15 to 45 parts by weight of $Na_2O$, 20 to 50 parts by weight of $K_2O$, and 5 to 20 parts by weight of $P_2O_3$.

In addition, the oxides may be mixed and pulverized into fine particles having a particle size of 1 to 2 μm by a pulverizer before being prepared as the desulfurization agent. The oxides may have a specific gravity of 2.5 to 3.0 and may be in the form of powder that is streak-colored or silvery white.

The desulfurization agent may include one or more metals selected from the group consisting of Li, Cr, Co, Ni, Cu, Zn, Ga, Sr, Cd, and Pb. As in one embodiment, all of the metals including Li, Cr, Co, Ni, Cu, Zn, Ga, Sr, Cd, and Pb are preferably included.

As the metals, the desulfurization agent may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, the metals, like the oxides, may be mixed and pulverized into fine particles having a particle size of 1 to 2 μm by a pulverizer, the metals may have a specific gravity of 2.5 to 3.0, and the metals may be in the form of powder that is streak-colored and silvery white.

The desulfurization agent may include at least one liquid composition selected from the group consisting of sodium tetraborate ($Na_2B_4O_7 \cdot 10H_2O$), sodium hydroxide (NaOH), sodium silicate ($Na_2SiO_3$) and hydrogen peroxide ($H_2O_2$).

As a solvent, water ($H_2O$) may be used. Preferably, all the liquid compositions including sodium tetraborate, sodium hydroxide, sodium silicate and hydrogen peroxide are preferably used.

The desulfurization agent according to the present invention forms a metal chelate compound through coordination with the metals because the oxides and the liquid compositions are mixed and reacted to serve as a chelating agent.

In addition, the liquid composition may be adsorbed on ash generated when a combustible material is combusted so that the liquid composition may react with sulfur oxides present in the ash, thereby removing the sulfur oxides. $NaBO_2$ is derived from the sodium tetraborate ($Na_2B_4O_7$), $NaBH_4$ is produced through hydrogenation, and the produced $NaBH_4$ reacts with oxygen and sulfur oxides to form sodium sulfate ($Na_2SO_4$). Thus, the sulfur oxides are removed. The reactions are represented by Reaction Formulas 1 and 2 below.

[Reaction Formula 1]

$$NaBH_4+O_3 \rightarrow Na_2O_2+H_2O+B$$

[Reaction Formula 2]

$$Na_2O_2+SO_3 \rightarrow Na_2SO_4+O \quad 1)$$

$$Na_2O_2+SO_2 \rightarrow Na_2SO_4 \quad 2)$$

$$Na_2O_2+SO \rightarrow Na_2SO_3 \quad 3)$$

In addition, the desulfurization agent may include, as the liquid compositions, the sodium tetraborate, the sodium hydroxide, the sodium silicate, and the hydrogen peroxide in amounts of 20 to 130 parts by weight, 15 to 120 parts by weight, 50 to 250 parts by weight, and 10 to 50 parts by weight, respectively.

When the desulfurization agent according to the present invention is mixed with a combustible material and combusted together at a temperature in a range of 400° C. to 1200° C., the effect of adsorbing sulfur oxides is activated. However, when the mixture is combusted in a temperature range of 600° C. to 900° C., high efficiency can be obtained.

In the present invention, the line mixer 130 receives the fuel oil and the desulfurization agent from the fuel oil tank 110 and the desulfurization agent tank 120, respectively and mixes the fuel oil and the desulfurization agent.

Figure 2:
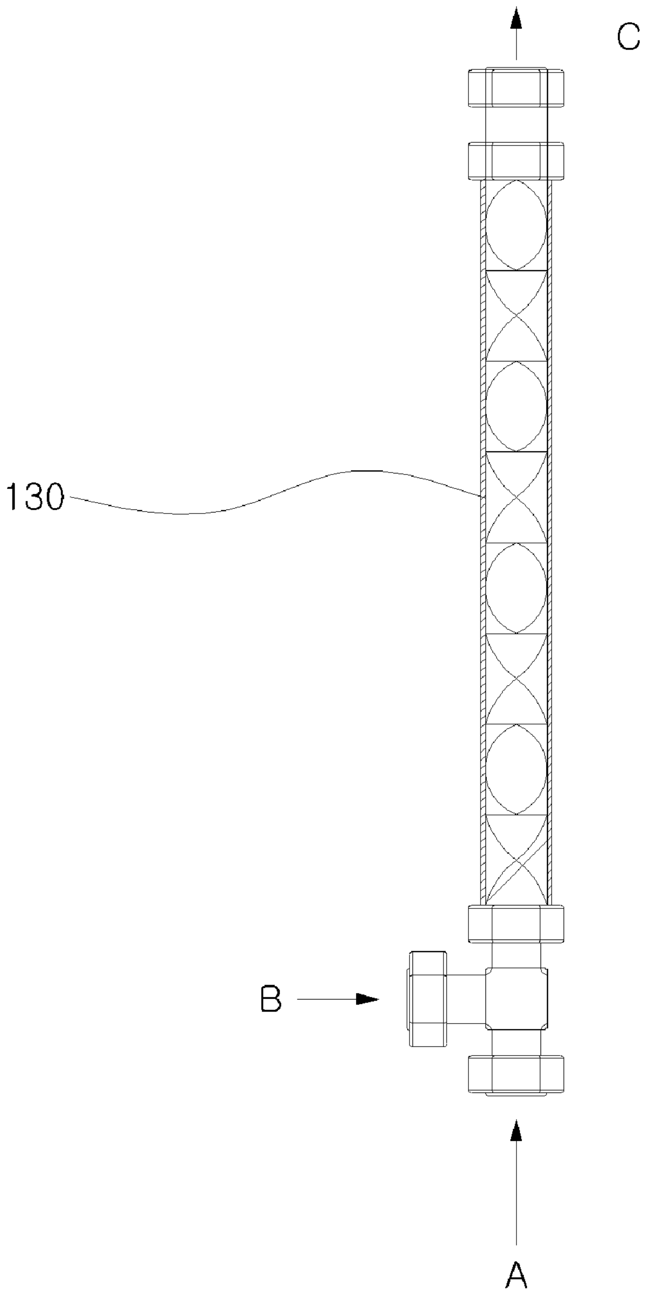
FIG. 2 is a plan view illustrating a line mixture of the desulfurization agent mixing system according to the present invention.

FIG. 2 is a plan view illustrating the line mixer 130 used in one embodiment of the present invention.

Referring to FIG. 2, the fuel oil is fed into the line mixer 130 through a portion denoted by A, and the desulfurization agent is fed into the line mixer 130 through a portion denoted by B. The fuel oil and the desulfurization agent introduced into the line mixer 130 are well mixed through line mixing, and the mixture of the fuel oil and the desulfurization agent flows out of the line mixer 130 through a portion denoted by C.

While the fuel oil is supplied at a constant flow rate, 3 to 10 parts by weight of the desulfurization agent is supplied per 100 parts by weight of the fuel oil, and the fuel oil and the desulfurization agent are mixed. For example, the desulfurization agent may be mixed in a ratio of 3 to 8 parts by weight, 3 to 6 parts by weight, 3 to 4 parts by weight, 4 to 10 parts by weight, 5 to 10 parts by weight, or 8 to 10 parts by weight, with respect to 100 parts by weight of the fuel oil.

When the supply of the desulfurization agent is less than 3 parts by weight per 100 parts by weight of the fuel oil, since the amount of the desulfurization agent dispersed in the fuel oil is not significant, the desulfurization effect is not sufficient. On the other hand, when the supply of the desulfurization agent exceeds 10 parts by weight per 100 parts by weight of the fuel oil, there is a problem in that the combustion efficiency of the mixture of the fuel oil and the desulfurization agent is reduced.

The feed flow rate of the mixture of the fuel oil and the desulfurization agent may be adjusted by a controller (not shown) included in the system.

In the present invention, the droplet atomization unit 200 serves to form droplets of the mixture of the fuel oil and the desulfurization agent that are mixed by the line mixer 130.

The droplet atomization unit 200 generates droplets to emulsify the fuel oil and the desulfurization agent into a W/O emulsion, thereby dispersing the desulfurization agent in the fuel oil.

As the droplet atomization unit 200, various existing devices can be used. Preferably, a homogenizer is used as the droplet atomization unit 200.

In addition, the droplet atomization unit 200 may apply pressure or shear force to the mixture of the fuel oil and the desulfurization agent to generate droplets.

In an embodiment of the present invention, the droplet atomization unit 200 is configured such that a plate with the same diameter as the inner diameter of a transfer pipe is prepared and fixed, and a plurality of fine holes is formed in the plate.

The mixture of the fuel oil and the desulfurization agent in the transfer pipe is conveyed by a transferring pump, and the mixture is pressed against the droplet atomization unit 200. The mixture impeded in movement by the droplet atomization unit 200 is finely dispersed while passing through the fine holes formed in the droplet atomization unit 200 due to the shear force and pressure, thereby forming droplets.

In one embodiment of the present invention, the fine holes formed in the plate of the droplet atomization unit 200 have a size in the range of 1 to 500 μm. For example, the fine holes of the droplet atomization unit may have a diameter in the range of 1 to 400 μm, 1 to 300 μm, 1 to 200 μm, 1 to 100 μm, 1 to 50 μm, 50 to 500 μm, 100 to 500 μm, 200 to 500 μm, 300 to 500 μm, 400 to 500 μm, 50 to 400 μm, 100 to 300 μm, or 200 to 300 μm. When the fine holes have a diameter smaller than 1 μm, only a small amount of the mixture passes through the droplet atomization unit so that a small number of droplets are generated. Therefore, the overall process slowly proceeds. On the other hand, the fine holes having a diameter larger than 500 μm result in reduction in droplet generation efficiency.

In addition, the droplet atomization unit 200 further includes a gas supply unit 210 to supply and mix gas when forming droplets of the mixture of the fuel oil and the desulfurization agent.

The gas supplied by the gas supply unit 210 during the droplet generation from the mixture forms air bubbles in the mixture. The air bubbles are repeatedly formed and destroyed, thereby influencing the surface tension of the fuel oil and the desulfurization agent and facilitating droplet formation.

The gas may be supplied before, during, or after the mixture passes through the droplet atomization unit 200, or may be configured to be supplied dependently or independently of each process.

As the gas used for the formation of bubbles, various known gases can be used. However, as the gas used in the present invention, air or oxygen ($O_2$) is preferably used to help emulsify the fuel oil and the desulfurization agent and to enable complete combustion during the subsequent combustion.

The gas can form bubbles having sizes in the range of 1 to 500 μm in the fuel oil. For example, the bubbles have sizes in the range of 1 to 400 μm, 1 to 300 μm, 1 to 200 μm, 1 to 100 μm, 1 to 50 μm, 50 to 500 μm, 100 to 500 μm, 200 to 500 μm, 300 to 500 μm, 400 to 500 μm, 50 to 400 μm, 100 to 300 μm, or 200 to 300 μm. When bubbles having sizes smaller than 1 μm are formed, it is difficult to form air bubbles in the mixture. When bubbles having sizes larger than 500 μm are formed, the bubbles are easily destroyed and easily escape to the outside because the stability of the bubbles is low.

In the present invention, the magnetization unit 300 serves to magnetize the fuel oil and desulfurization agent mixture in which drops are formed by the droplet atomization unit 200.

The magnetization unit 300 generates a magnetic field around the transfer pipe through which the fuel oil and desulfurization agent mixture flows with the use of a magnetic member installed inside or outside the transfer pipe. Thus, the fuel oil and desulfurization agent mixture is magnetized by passing through the transfer pipe around which the magnetic field is formed.

Since the fuel oil is hydrophobic and the desulfurization agent is hydrophilic, the mixture that has passed through the magnetic field has electrical charges or magnetic moments due to magnetic force. This maximizes a dispersing effect, thereby facilitating emulsification.

The magnetic field has a magnetic flux density of 9,000 to 15,000 gauss. For example, the magnetic field may have a magnetic flux density in the range of 9,000 to 13,000 gauss, 9,000 to 11,000 gauss, 9,000 to 10,000 gauss, 10,000 to 15,000 gauss, or 12,000 to 15,000 gauss. When the magnetic flux density is outside the range, formation of electric charge or magnetic moment in the mixture does not occur or occurs weakly, thereby reducing the dispersion effect.

In addition, the magnetization unit 300 may use a variety of known members that can form a magnetic field. For example, a magnet or an electromagnet may be used. Preferably, a permanent magnet is used, and at least one permanent magnet may be installed for each pipeline.

The flow direction of the magnetic field generated by the magnetization unit 300 may be the same as the flow direction of the mixture, or the flow direction of the magnetic field may be perpendicular to the flow direction of the mixture.

In the present invention, the vortex reaction unit 400 serves to turn the magnetized fuel oil and desulfurization agent mixture.

The fuel oil and desulfurization agent mixture magnetized by the magnetization unit 300 is supplied to the vortex reaction unit 400 by a pump so that the mixture can swirl in the vortex reaction unit 400. Thus, the fuel oil and the desulfurization agent are violently mixed so that the desulfurization agent can be well dispersed in the fuel oil.

The vortex reaction unit 400 allows the mixture introduced into a vessel with a circular or oval-shaped internal space so that the mixture can be easily swirled and mixed.

In addition, the vortex reaction unit 400 is composed of multi-stage cylinders having different sizes and allows the mixture to be introduced into the multi-stage cylinders and swirled so that the desulfurization agent can be well dispersed in the fuel oil.

Figure 3:
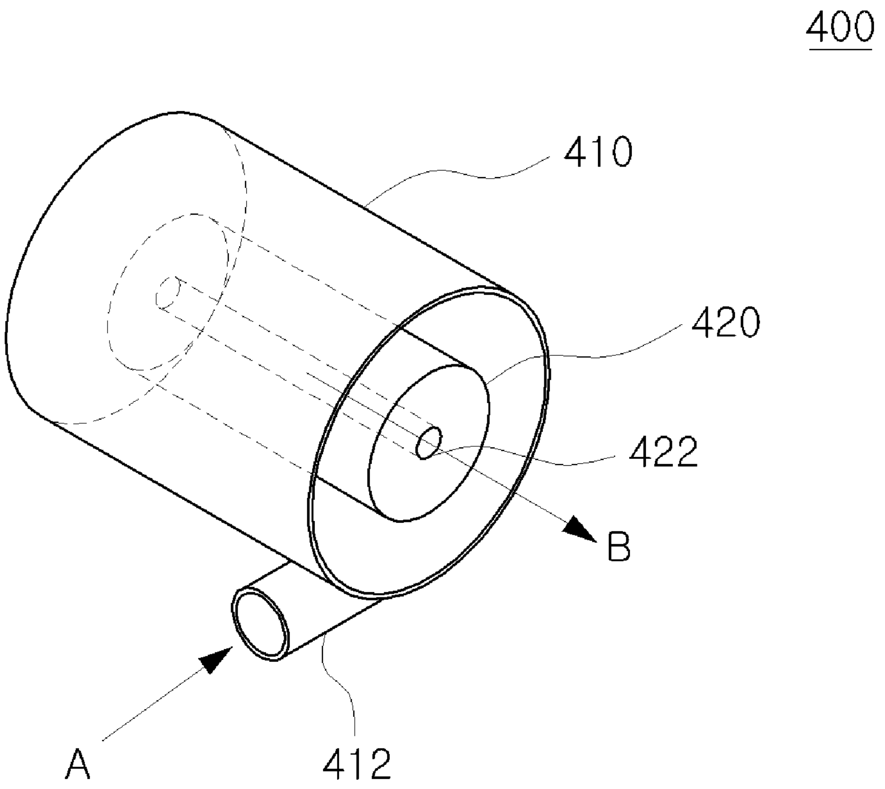
FIG. 3 is a perspective view illustrating a vortex reaction unit of the desulfurization agent mixing system according to the present invention.

FIG. 3 is a perspective view illustrating a vortex reaction unit 400 according to one embodiment. Referring to FIG. 3, the vortex reaction unit 400 includes an outer cylinder 410 and an inner cylinder 420. A first side of the outer cylinder 410 is provided with an inlet 412 through which the mixture is introduced, and a center portion of the inner cylinder 420 is provided with an outlet 422 through which the mixture is ejected.

When the first side in which the inlet is formed is assumed to be the upper surface of the inner cylinder 420, the upper surface of the inner cylinder 420 is formed to be flush with the upper surface of the outer cylinder 410, and the lower surface of the inner cylinder 420 is spaced from the lower surface of the outer cylinder 410 so that a predetermined space is formed between the lower surface of the inner cylinder 420 and the lower surface of the outer cylinder 410.

The vortex reaction method performed by the vortex reaction unit 400 will be described in detail. The fuel oil and the desulfurization agent that are magnetized are introduced into the vortex reaction unit 400 through the inlet 412 under the static pressure of the pump (see arrow A in FIG. 3), and the mixture is vigorously mixed while performing dynamic swirling with a strong rotational force in the space formed between the inner cylinder 420 and the outer cylinder 410.

The mixture swirled several times under pressure is discharged to the outside (see arrow B in FIG. 3) through the outlet 422 formed in the lower surface of the inner cylinder 420.

In the present invention, the gas separation unit 500 serves to separate the gas contained in the mixture of the fuel oil and the desulfurization agent that are mixed and dispersed through vortex reaction in the vortex reaction unit 400.

As an embodiment of the gas separation unit 500, the mixture that has been swirled and reacted is fed into a compressible chamber and is then pressurized. The gas present in the mixture may be separated as the fuel oil or the desulfurization agent when the mixture is pressurized.

The separated liquid (mixture) is transferred to the collision emulsion unit 600 to be described later, and the gas is discharged to the outside or transferred to the emulsion tank 700 to be described later.

In the present invention, the collision emulsion unit 600 serves to cause the liquid mixture of the fuel oil and the desulfurization agent to collide against a collision target.

The collision emulsion unit 600 ejects the fuel oil and desulfurization agent mixture via an injector such as a sprayer, thereby causing the mixture to strongly collide with the collision target to form finer droplets.

The collision target refers to an object that collides with the fuel oil and desulfurization agent mixture, and various known objects capable of imparting collision energy can be used as the collision target. For example, a wall or a pipe may be used.

In the collision emulsion unit 600, the fuel oil and desulfurization agent mixture is made to collide with the collision target which is a colliding structure such as a wall or pipe, thereby forming fine droplets in the mixture. This facilitates dispersion and enables the emulsified state to be maintained for a long time.

For the collision of the fuel oil and desulfurization agent mixture ejected from the collision emulsion unit 600, various known structures such as walls or pipes can be used. The mixture may collide at any angle but preferably collides at an angle of 15° with respect to the flow direction in which the mixture is ejected.

The emulsion tank 700 serves to store the fuel oil and desulfurization agent mixture which is impacted by the collision emulsion unit 600.

The emulsion tank 700 supplies a water-based desulfurization agent to fuel oil, which is oil, and stores a water-in-oil (W/O) emulsified fuel oil and a desulfurization agent mixture. During storage, the emulsified mixture is fueled into vehicles used in harbors or ships according to operation of a lubricator 800.

In the present invention, the emulsion tank 700 may be equipped with a level sensor. The level sensor measures the level of the emulsified fuel oil and desulfurization agent mixture contained in the emulsion tank 700.

When the level of the emulsified mixture in the emulsion tank 700 is higher than or equal to a predetermined level, the controller (not shown) included in the system performs the control of sending a signal to set a recirculation mode in which a first valve 710 installed between the fuel oil tank 110 and the line mixer 130 closes and a second valve 720 installed between the emulsion tank 700 and the line mixer 130 opens so that the fuel oil and desulfurization agent mixture contained in the emulsion tank 700 is circulated from the line mixer 130 to the emulsion tank 700.

When the level of the mixture in the emulsion tank 700 is below a predetermined level, the controller sends a signal to set a mixing mode in which the first valve 710 opens and the second valve 720 closes so that the fuel oil and the desulfurization agent are supplied from the fuel oil tank 110 and the desulfurization agent tank 120 and are then mixed to produce an emulsified mixture, and the emulsified mixture is supplied to the emulsion tank 700 to raise the level in the emulsion tank 700.

The desulfurization agent mixing system 100 for fuel oil used in harbors, according to the present invention, uses fuel oil, which is oil, as a continuous phase and a water-based desulfurization agent as a disperse phase. The system emulsifies the desulfurization agent through water-in-oil (W/O) emulsification and feeds the resulting emulsion to vehicles used in harbors or ships. Since the fuel oil and the desulfurization agent are burned together during combustion, sulfur oxides that may occur during the combustion are removed whereby sulfur oxide emissions are reduced.

In the case where the desulfurization agent mixing system 100 for fuel oil used in harbors, according to the present invention, is used, unlike conventional systems that are fixedly installed at a predetermined site and perform a desulfurization operation on exhaust gas, a desulfurization agent is mixed with fuel oil used for vehicles that are movable devices, and the mixture of the fuel oil and the desulfurization agent is fueled into the vehicles. Therefore, existing vehicle engines can be used, without being equipped with an additional desulfurization apparatus. The system can be simply and easily applied to existing vehicles and has an excellent desulfurization effect.

INDUSTRIAL APPLICABILITY

The present invention can be widely used for desulfurization agent mixing systems.

The invention claimed is:

1. A desulfurization agent mixing system for fuel oil used in harbors, the system comprising:

a fuel oil tank for storing fuel oil;

a desulfurization agent tank for storing a desulfurization agent;

a line mixer configured to receive the fuel oil and the desulfurization agent from the fuel oil tank and the desulfurization agent tank, respectively and to mix the fuel oil and the desulfurization agent to produce a mixture;

a droplet atomization unit configured to generate droplets from the mixture generated by the line mixer;

a magnetization unit configured to magnetize the mixture containing droplets generated by the droplet atomization unit;

a vortex reaction unit configured to swirl and react the mixture magnetized by the magnetization unit;

a gas separation unit configured to separate gas from the mixture of the fuel oil and the desulfurization agent in the vortex reaction unit;

a collision emulsion unit configured to cause the mixture from which the gas is separated by the gas separation unit to collide with a collision target; and an emulsion tank for storing the fuel oil and desulfurization agent mixture having undergone the collision by the collision emulsion unit, wherein the droplet atomization unit has a plurality of fine holes to form droplets under pressure.

2. The system according to claim 1, wherein the line mixer may receive 3 to 10 parts by weight of the desulfurization agent per 100 parts by weight of the fuel oil and mixes the desulfurization agent with the fuel oil.

3. The system according to claim 1, further comprising a gas supply unit configured to supply gas to the droplet atomization unit.

4. The system according to claim 3, wherein the gas is air or oxygen ($O_2$).

5. The system according to claim 3, wherein the gas generates bubbles having sizes ranging from 1 to 500 μm in the fuel oil.

6. The system according to claim 1, wherein the magnetization unit magnetizes the mixture with a magnetic field having a magnetic flux density of 9,000 to 15,000 gauss.

7. The system according to claim 1, wherein the magnetization unit forms a magnetic field perpendicular to a transport direction in which the mixture of the fuel oil and the desulfurization agent flows.

8. The system according to claim 1, wherein the collision emulsion unit ejects the mixture of the fuel oil and the desulfurization agent such that the mixture collides against the collision target at an angle of 15°.

9. The system according to claim 1, wherein the emulsion tank comprises a level sensor, and a mixing mode or a recirculation mode is selected according to a level in the emulsion tank.

* * * * *